(12) United States Patent
Hsieh et al.

(10) Patent No.: US 10,141,296 B2
(45) Date of Patent: Nov. 27, 2018

(54) DUMMY FIN CELL PLACEMENT IN AN INTEGRATED CIRCUIT LAYOUT

(71) Applicant: TAIWAN SEMICONDUCTOR MANUFACTURING CO., LTD., Hsinchu (TW)

(72) Inventors: Tung-Heng Hsieh, Hsinchu County (TW); Tzung-Chi Lee, Taipei County (TW); Yu-Jung Chang, Hsinchu County (TW); Bao-Ru Young, Hsinchu County (TW)

(73) Assignee: TAIWAN SEMICONDUCTOR MANUFACTURING CO., LTD., Hsinchu (TW)

( * ) Notice: Subject to any disclaimer, the term of this patent is extended or adjusted under 35 U.S.C. 154(b) by 0 days.

(21) Appl. No.: 15/854,358

(22) Filed: Dec. 26, 2017

(65) Prior Publication Data

US 2018/0137232 A1 May 17, 2018

Related U.S. Application Data

(62) Division of application No. 15/197,026, filed on Jun. 29, 2016.

(51) Int. Cl.
*H01L 27/02* (2006.01)
*H01L 29/66* (2006.01)
*H01L 29/78* (2006.01)
*G06F 17/50* (2006.01)

(52) U.S. Cl.
CPC ...... *H01L 27/0207* (2013.01); *G06F 17/5072* (2013.01); *H01L 29/6681* (2013.01); *H01L 29/7851* (2013.01)

(58) Field of Classification Search
CPC ........... H01L 29/66795; H01L 29/6681; H01L 27/0886; H01L 21/823431; H01L 29/785; H01L 27/0207; H01L 29/66545; H01L 29/41791; H01L 27/0688; H01L 21/823828; H01L 21/82385; H01L 23/485;
(Continued)

(56) References Cited

U.S. PATENT DOCUMENTS 8,726,220 B2 5/2014 Lin et al.
9,105,467 B2 8/2015 Lee et al.
9,147,029 B2 9/2015 Ke et al.
(Continued)

OTHER PUBLICATIONS

Non-Final Office Action issued in corresponding parent U.S. Appl. No. 15/197,026, dated Jun. 21, 2017.

*Primary Examiner* — Bac Au
(74) *Attorney, Agent, or Firm* — McDermott Will & Emery LLP

(57) ABSTRACT

In a method of forming an integrated circuit (IC) layout, an empty region in the IC layout is identified by a processor circuit, wherein the empty region is a region of the IC layout not including any active fins. A first portion of the empty region is filled with a first plurality of dummy fin cells, wherein each of the first plurality of dummy fin cells is based on a first standard dummy fin cell, and wherein the first standard dummy fin cell has a first gate width and comprises a first plurality of partitions. A second portion of the empty region is filled with a second plurality of dummy fin cells, wherein each of the second plurality of dummy fin cells is based on a second standard dummy fin cell, and wherein the second standard dummy fin cell has a second gate width and comprises a second plurality of partitions.

20 Claims, 21 Drawing Sheets

(58) Field of Classification Search
CPC ... G06F 17/5081; G06F 17/5072; G06F 17/50
See application file for complete search history.

(56) References Cited

U.S. PATENT DOCUMENTS

| | | |
|---|---|---|
| 9,460,259 B2 | 10/2016 | Baek et al. |
| 9,524,361 B2 | 12/2016 | Tseng et al. |
| 2014/0325466 A1 | 10/2014 | Ke et al. |
| 2016/0284706 A1 | 9/2016 | Chung et al. |

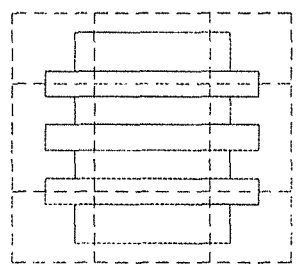
FIG. 5A

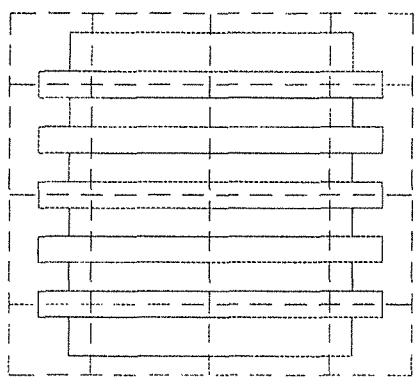
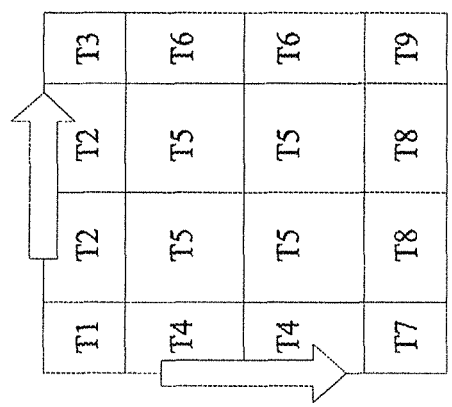
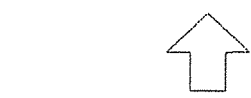
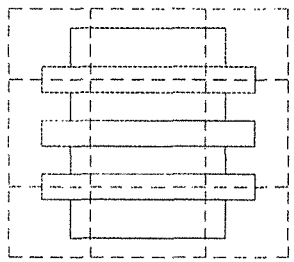
FIG. 5B

DUMMY FIN CELL PLACEMENT IN AN INTEGRATED CIRCUIT LAYOUT

CROSS-CITED RELATED APPLICATIONS

This is a Divisional of U.S. patent application Ser. No. 15/197,026, filed on Jun. 29, 2016, the contents of which are incorporated herein by reference in its entirety.

TECHNICAL FIELD

The disclosure relates to an integrated circuit layout, more particularly to a dummy fin cell placement in an integrated circuit layout.

BACKGROUND

With the increasing down-scaling of integrated circuits (ICs) and increasingly demanding requirements to the speed of ICs, transistors need to have higher drive currents with increasingly smaller dimensions. Fin field-effect transistors (FinFETs) were thus developed. In a FinFET, portions of a substrate are etched away to create a vertical fin structure. This vertical fin structure is used to form source/drain regions in the lateral direction, forming a channel region in the fin. A gate is formed over the fin in the vertical direction, thus forming a FinFET.

BRIEF DESCRIPTION OF THE DRAWINGS

The present disclosure is best understood from the following detailed description when read with the accompanying figures. It is emphasized that, in accordance with the standard practice in the industry, various features are not drawn to scale and are used for illustration purposes only. In fact, the dimensions of the various features may be arbitrarily increased or reduced for clarity of discussion.

FIGS. 5A-5C illustrate various block diagrams for expanding dummy fin cells in accordance with some embodiments.

DETAILED DESCRIPTION

Figure 1A:
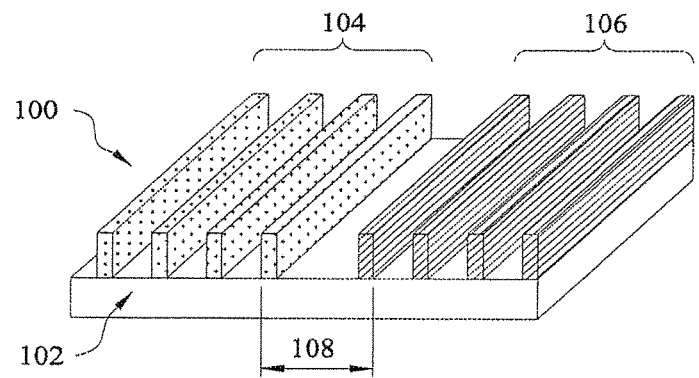
FIGS. 1A-1D illustrate a portion of an integrated circuit that includes fin structures.

It is to be understood that the following disclosure provides many different embodiments, or examples, for implementing different features of the invention. Specific embodiments or examples of components and arrangements are described below to simplify the present disclosure. These are, of course, merely examples and are not intended to be limiting. For example, dimensions of elements are not limited to the disclosed range or values, but may depend upon process conditions and/or desired properties of the device. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Various features may be arbitrarily drawn in different scales for simplicity and clarity.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. In addition, the term "made of" may mean either "comprising" or "consisting of".

FIGS. 1A-1D illustrate a portion of an integrated circuit (IC) 100 that includes fin structures. The IC 100 includes a substrate 102, a fin structure array 104, and a dummy fin structure array 106. The dummy fin structures that form the dummy fin structure array 106 fill an empty region near the fin structure array 104. The portion of the IC 100 may form a FinFET device or a portion thereof.

In some embodiments, the substrate 102 is a semiconductor substrate. The substrate 102 may comprise an elementary semiconductor, such as silicon or germanium; a compound semiconductor including Group IV-IV compound semiconductors such as SiC and SiGe, Group III-V compound semiconductors such as GaAs, GaP, GaN, InP, InAs, InSb, GaAsP, AlGaN, AlInAs, AlGaAs, GaInAs, GaInP, and/or GaInAsP; or combinations thereof. In one embodiment, the substrate 102 is a silicon layer of an SOI (silicon-on insulator) substrate. Amorphous substrates, such as amorphous Si or amorphous SiC, or insulating material, such as silicon oxide may also be used as the substrate 102. The substrate 102 may include various regions that have been suitably doped with impurities (e.g., p-type or n-type conductivity). In the case that silicon is used as the substrate 102, the fin structures formed (e.g., the fin structure array 104, the dummy fin structure array 106) may be referred to as silicon fin structures or simply as silicon fins.

Figure 1B:
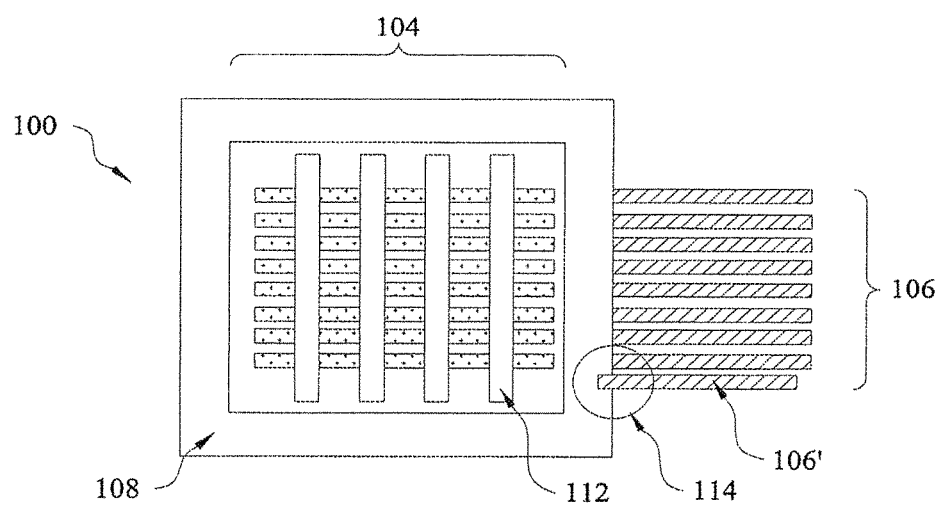

Fin structures of the dummy fin structure array 106 are referred to herein as dummy fin structures. The term "dummy" is utilized because the dummy fin structures are fabricated and form part of the IC 100 but are not utilized in the functionality of the IC 100. In contrast, fin structures of the fin structure array 104 are utilized in the functionality of the IC 100, and may be referred to as active fin structures or simply as fin structures. For example, FIG. 1B illustrates a top-down view of the IC 100 where gate structures 112 are formed over the fin structure array 104. In contrast, the dummy fin structure array 106 may or may not have gate structures 112 formed thereon. Furthermore, interconnect structures (not shown), such as conductive lines and vias, may be formed over the fin structure array 104 and the gate structures 112 to electrically connect various FinFETs to form functional circuits in the IC 100. In contrast, the dummy fin array 106 is not utilized to form functional circuits.

Figure 1C:
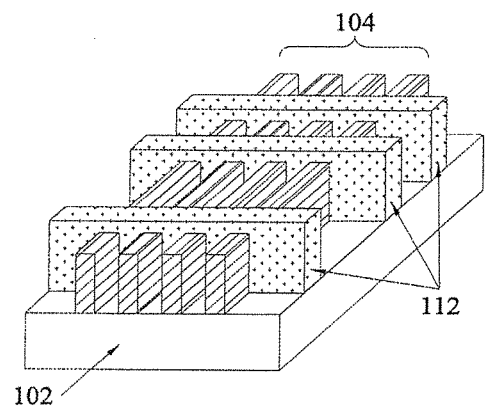
Figure 1D:
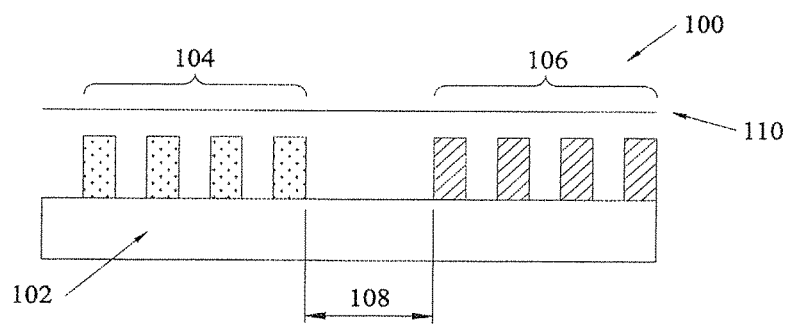

FIG. 1C illustrates a perspective view of the fin structure array 104 and gate structures 112. The gate structures 112 and the fin structure array 104 are formed in substantially non-parallel (e.g., perpendicular) directions. Portions of the fin structure array 104 covered by the gate structures 112 may form various channel regions, and source drain regions may be formed in the fin structure array 104 on either side of each channel region. In embodiments where gate structures are formed over the dummy fin structures, a substantially similar configuration as that shown in FIG. 1C may be used for the dummy fin structure array 106.

The presence of dummy fin structures may be utilized to facilitate photolithography operations performed during the fabrication of the IC 100. For example, in FIG. 1D, during a photolithography operation, the presence of the dummy fin structure array 106 may allow a top surface 110 of a photoresist layer to have a more even topology relative to a case in which no dummy fin structures are formed on the substrate 102. The dummy fin structure array 106 may also reduce differences in polysilicon gate density within and across different portions of the IC 100. In some embodiments, the polysilicon gate density is the ratio of an area above a surface of the substrate 102 with polysilicon gate deposited to an area above the entire surface of the substrate 102. Non-uniformity in the polysilicon gate density may cause chemical mechanical polishing (CMP) operations to affect different portions of the IC 100 differently. In some cases, the difference in polysilicon gate density may contribute to CMP loading. The CMP loading may cause, for instance, the polysilicon gate to have different heights in different portions of the IC 100, which may induce device shift. The presence of the dummy fin structure array 106 may facilitate reduction of CMP loading.

While FIGS. 1A-1D illustrate a particular number of fins in the fin structure array 104, the dummy fin structure 106, and the gate structures 112, any number of such features may be formed depending on the IC design. In order to ensure the dummy fin structures of the dummy fin structure array 106 do not interfere with the operation of the fin structure array 104, the dummy fin structures of the dummy fin structure array 106 may be separated from the fin structure array 104 by a minimum spacing 108. The size of the minimum spacing 108 may vary between different ICs depending on the properties of the particular devices on the ICs and/or standardized design layout rules. In designing the layout for the IC 100, the dummy fin structures of the dummy fin structure array 106 should not be placed within the minimum spacing 108. The minimum spacing 108 may be set to a distance such that the presence of the dummy fin structures does not affect functionality of the ICs. For example, a layout that includes an area such as area 114 in FIG. 1B, in which a dummy fin structure 106' extends into a region defined by the minimum spacing 108, should be avoided. In some embodiments, the minimum spacing 108 is in a range between 100 nm to about 120 nm.

An IC layout may include one or more device regions and one or more empty regions. A device region may be defined with components such as transistors (e.g., gates, source/drain regions, p-wells, etc.), capacitors, resistors, fin cells, etc. that, when fabricated, may be utilized to achieve structural and functional requirements of a device. The device region may also be referred to as the active region (e.g., general active device region), main region, or main pattern of the IC layout. An empty region refers to a portion of an IC device layout with only substrate (e.g., 102). In this regard, the empty region does not have any active fin cells, transistors, polysilicon material, p-wells, n-wells, etc. disposed on the substrate. The empty region may be filled in with dummy fin cells, and may be referred to as a fill region. The IC layout may be implemented (e.g., translated into fabrication operations) to form an IC, such as the IC 100 shown in FIG. 1A. When fabricated, the dummy fin cells defined in the empty region are physically realized as dummy fin structures.

Figure 2A:
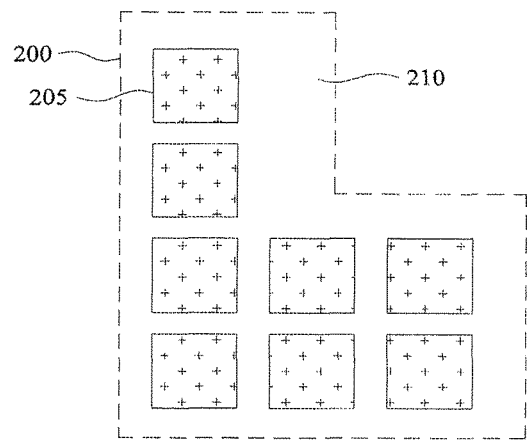
FIGS. 2A and 2B illustrate examples of layouts of empty regions filled in with dummy fin cells.
Figure 2B:
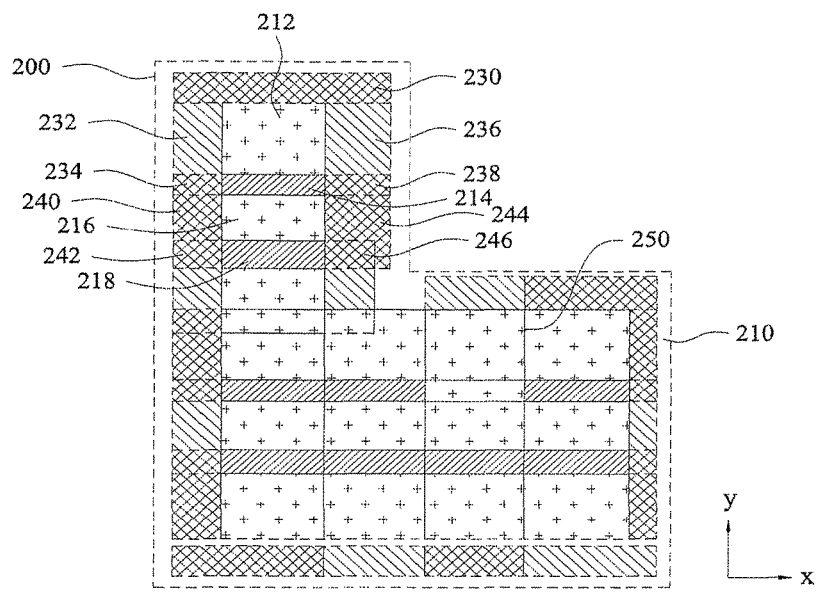

FIG. 2A illustrates an example of a layout of an empty region 200 that is filled in with dummy fin cells of a single size. Each of the dummy fin cells (e.g., dummy fin cell 205) may be a standard dummy fin cell (e.g., defined in a standard library). The dummy fin cells may be disposed over a substrate layer 210 of the layout. FIG. 2B illustrates an example of the empty region 200 that is filled in with dummy fin cells according to some embodiments of the present disclosure. In some embodiments, the dummy fin cells are based on (e.g., derived from) the standard dummy fin cell (e.g., 205) illustrated in FIG. 2A. In FIGS. 2A and 2B, the y-direction is the vertical direction and x-direction is the horizontal direction.

In FIG. 2B, dummy fin cells may be disposed over the substrate layer 210 of the layout dummy fin cells. Each of the dummy fin cells may be based on the standard dummy fin cell (e.g., 205) illustrated in FIG. 2A. The dummy fin cells may be expanded in the x- and/or y-directions. For instance, a first dummy fin cell formed of portions 212, 214, 230, 232, 234, 236, and 238 may be disposed over the substrate layer 210. In some embodiments, the portions 212 and 214 form the standard dummy fin cell (e.g., 205), whereas the portions 230, 232, 234, 236, and 238 are the expanded portions of the standard dummy fin cell. The portions 214, 234, and 238 may represent overlapping portions of the first dummy fin cell and a second dummy fin cell. In this regard, the portion 214 may represent an overlap of two adjacent standard dummy fin cells, whereas the portions 234 and 238 may represent an overlap of expanded portions of two adjacent standard dummy fin cells.

Similarly, the second dummy fin cell includes portions 214, 216, and 218, which form the standard dummy fin cell. The second dummy fin cell also includes portions 234, 238, 240, 242, 244, and 246, which are expanded portions of the standard dummy fin cell. The portions 214, 234, and 238 of the second dummy fin cell overlap with the first dummy fin cell. The portions 218, 242, and 246 of the second dummy fin cell overlap with a third dummy fin cell.

In some embodiments, the dummy fin cells are allowed to overlap along the y-direction. In some embodiments, the dummy fin cells are allowed to abut along the x-direction. As shown in FIG. 2B, the dummy fin cells abut along the x-direction such that an end of one dummy fin cell (e.g., left of line 250) is connected with a beginning of an adjacent dummy fin cell (e.g., right of line 250). In some cases, when fabricating, for example, three dummy fin cells that abut along the x-direction, one long dummy fin cell is fabricated rather than three individual dummy fin cells. The resizing (e.g., expanding) of the standard dummy fin cell may facilitate minimization of unfilled portions of the empty region 200.

Figure 3A:
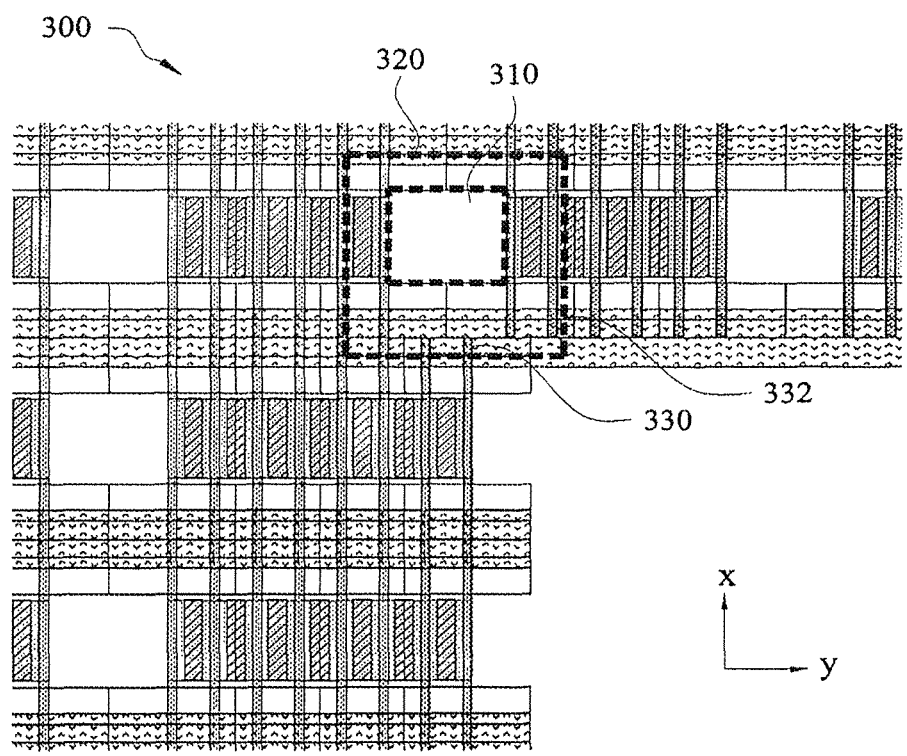
FIG. 3A illustrates an example of a layout of an integrated circuit with regions that are filled in with dummy fin cells.
Figure 3B:
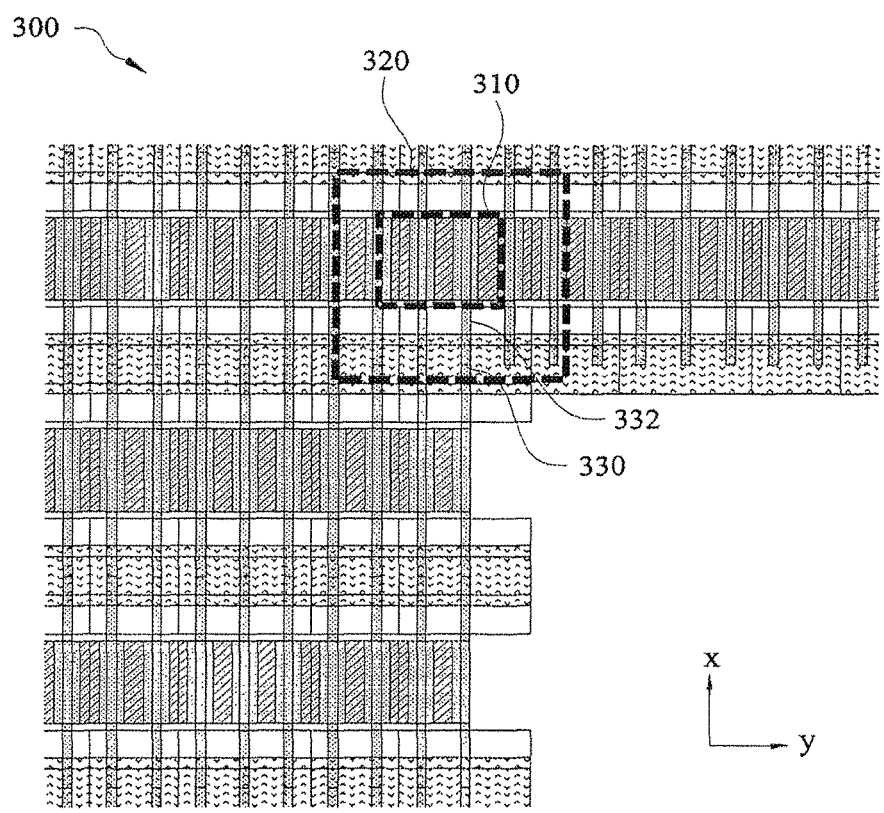
FIG. 3B illustrates the layout of the integrated circuit of FIG. 3A with the dummy fin cells adjusted to include additional overlapping between the dummy fin cells.

FIG. 3A illustrates an example of a layout of an IC 300 with regions that are filled in with dummy fin cells. Each of the dummy fin cells may be, or may be derived from (e.g., expansion of) a standard dummy fin cell. The IC 300 includes a region 320 that encompasses a region 310. The region 320 in FIG. 3A includes dummy fin cells whereas the region 310 in FIG. 3A is an empty region (e.g., a substrate surface with nothing disposed on it). The region 320 includes a gate structure 330 and a gate structure 332. FIG. 3B illustrates the layout of the IC 300 of FIG. 3A with the dummy fin cells adjusted to include additional overlapping in the y-direction. In FIGS. 3A and 3B, the y-direction is the horizontal direction and the x-direction is the vertical direction.

In some embodiments, the number of dummy fin cells in FIG. 3A is the same as the number of dummy fin cells in FIG. 3B. By increasing the amount of overlap between dummy fin cells and/or number of dummy fin cells that overlap, the gate density (e.g., polysilicon gate density) can be increased. For instance, the region 310, which is an empty region in FIG. 3A, is filled with gate structures in FIG. 3B by overlapping the dummy fin cells (e.g., overlapping at least those dummy fin cells in the region 320). In effect, in FIG. 3B, the overlapping causes the gate structures of the overlapping dummy fin cells to be brought closer together. The overlapping causes the gate structures 330 and 332 to abut along the x-direction in FIG. 3B, whereas the gate structure 330 and 332 are disjoint from each other in FIG. 3A.

Figure 4A:
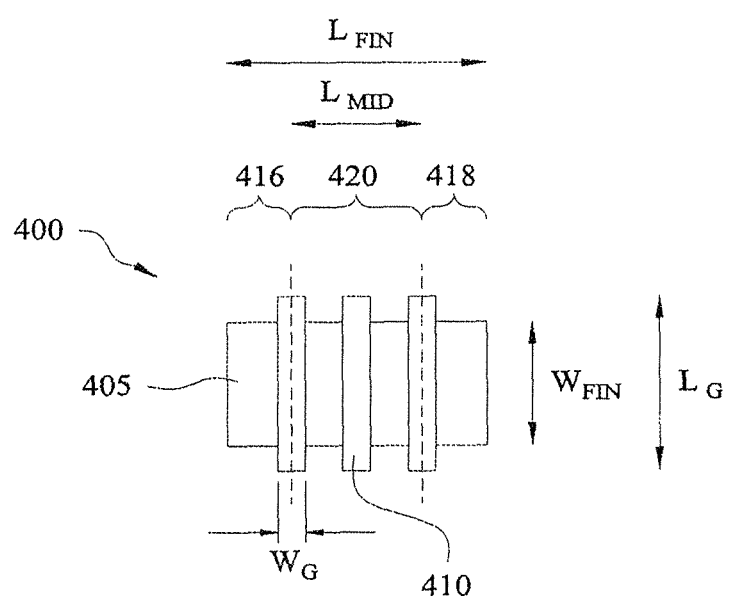
FIG. 4A illustrates an example of a standard dummy fin cell.

FIG. 4A illustrates an example of a standard dummy fin cell 400. The standard dummy fin cell 400 includes a dummy fin 405 and a dummy gate 410 disposed over the dummy fin 405. The standard dummy fin cell 400 may be divided into a first edge portion 416, a second edge portion 418, and a middle portion 420. The first edge portion 416 and the second edge portion 418 may, but need not, have the same dimensions. Other manners by which to divide the standard dummy fin cell 400 into portions may be utilized. The term portions may be utilized interchangeably with the term partitions.

The standard dummy fin cell 400 may be defined in a standard library. In certain embodiments, the standard library is a database that stores definitions of standard cells, including standard dummy fin cells. The standard cells may be utilized by computer aided design (CAD) tools (e.g., electronic design automation (EDA) tools) to facilitate forming of IC layouts. The standard dummy fin cell 400 may be defined using a set of characteristics. By way of non-limiting example, the characteristics may include a number of partitions, a size/shape of each partition, a number of gate structures, a material of the gate structures, a gate width associated with the gate structures, among others. The standard dummy fin cell 400 may be utilized as a baseline fin cell from which dummy fin cells of other sizes may be derived. In some embodiments, the gate width $W_G$ is between 8 nm and 12 nm. In some embodiments, the gate length $L_G$ is between 0.6 μm and 1.2 μm. In some embodiments, the dummy gate 410 is a polysilicon gate. In some embodiments, the fin length $L_{FIN}$ is between 1.0 μm and 2.0 μm. In some embodiments, the fin width $W_{FIN}$ is between 0.3 μm and 0.7 μm. In some embodiments, the length of the middle portion 420 is between 0.8 μm and 1.8 μm.

Figure 4B:
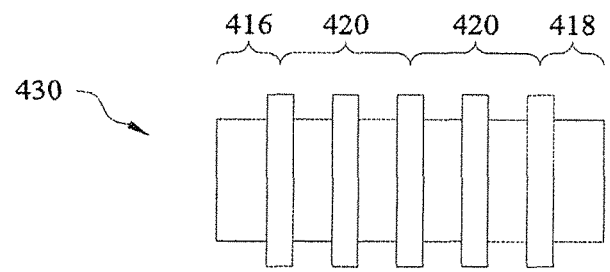
FIGS. 4B-4D illustrate examples of dummy fin cells derived from the standard dummy fin cell of FIG. 4A in accordance with some embodiments.

In some embodiments, to create an expanded dummy fin cell, the edge portions 416 and 418 remain constant while the middle portion 420 is duplicated. As an example, FIG. 4B illustrates a dummy fin cell 430 derived from the standard dummy fin cell 400. The expanded dummy fin cell 430 includes the first edge portion 416, the second edge portion 418, and two middle portions 420. As another example, FIG. 4C illustrates an expanded dummy fin cell 432 includes the first edge portion 416, the second edge portion 418, and three middle portions 420.

By using the standard dummy fin cell 400 as a base dummy fin structure from which to create expanded dummy fin cells, the size of the expanded dummy fin cell is derived from and related to the size of the standard dummy fin cell 400. Thus, the file size of an IC layout file (e.g., a graphic database system (GDS) file) corresponding to an IC layout that utilizes the standard dummy fin cell 400 and/or expanded dummy fin cells based on the standard dummy fin cell 400 may be comparatively small, since the expanded dummy fin cells may be defined using the standard dummy fin cell 400. In contrast, if the size of an expanded dummy fin cell is unrelated to any standard dummy fin cell (e.g., each expanded dummy fin cell has a definition independent of any standard dummy fin cell), the file size of the IC layout file corresponding to IC layout may be larger.

Figure 4C:
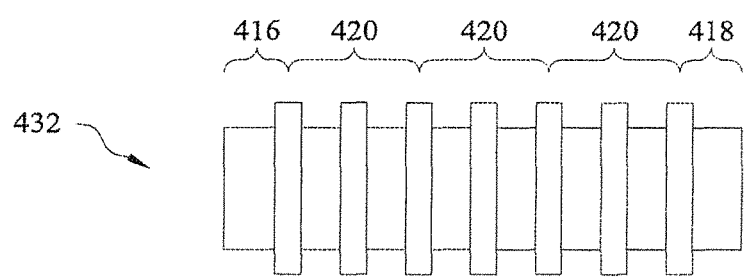
Figure 4D:
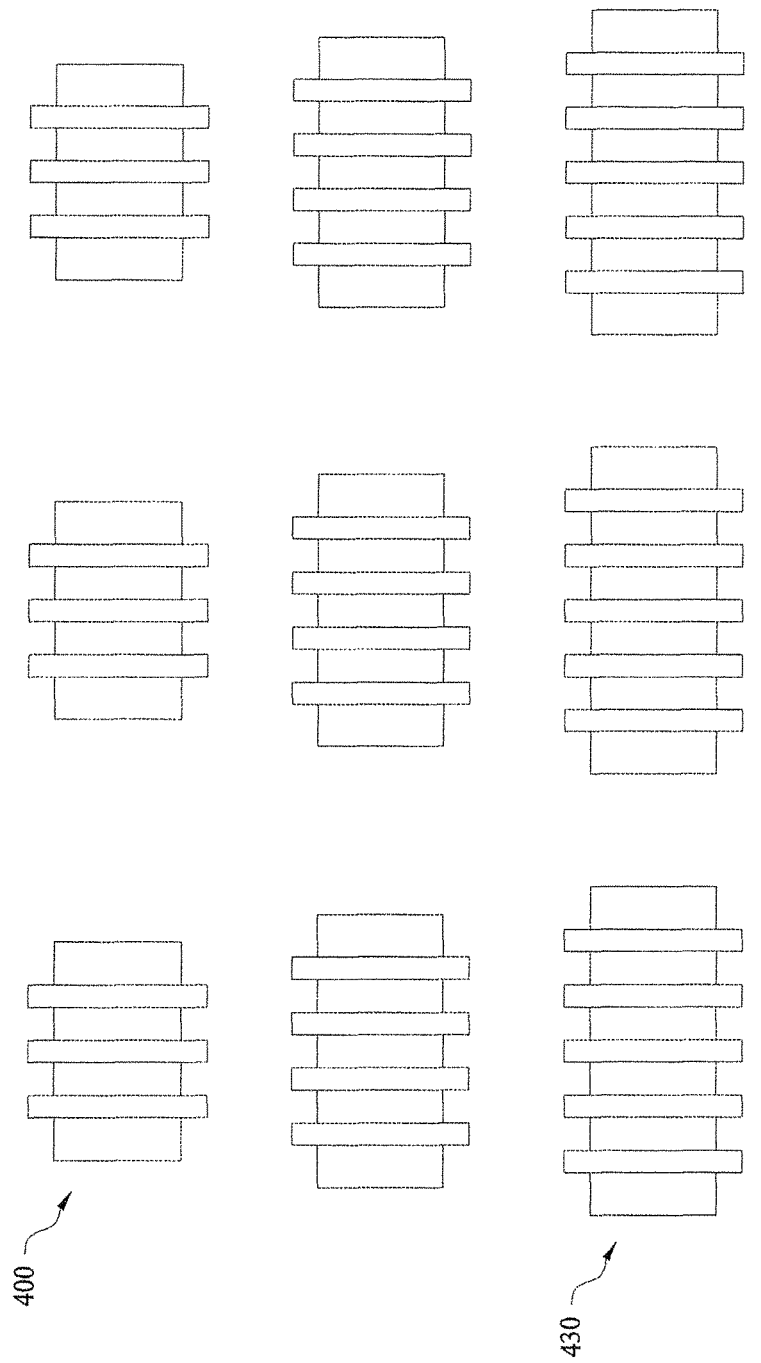

FIGS. 4B and 4C illustrate expansion of dummy fin cells along the horizontal direction. As illustrated by FIG. 4D, dummy fin cells may be expanded in the horizontal and/or vertical directions. Like horizontal expansion, vertical expansion may also be achieved by multiplying the height of the standard dummy fin cell 400 (or a horizontally expanded dummy fin cell) by a constant. Therefore, a vertically expanded dummy fin cell may also be a scaling and/or duplication of the standard dummy fin cell 400 or a portion/partition thereof, and the IC layout file size may be reduced. Expansion may occur in the horizontal and/or vertical directions.

With reference to FIG. 4D, along each column, the dimension along a vertical direction (e.g., y-direction) of the dummy fin cell remains constant whereas the dimension along the horizontal dimension (e.g., x-dimension) of the dummy fin cell increases going down the column. Along each row, the dimension along the horizontal dimension of the dummy fin cell remains constant whereas the dimension along the vertical direction of the dummy fin cell increases going from left to right of the row.

Figure 5C:
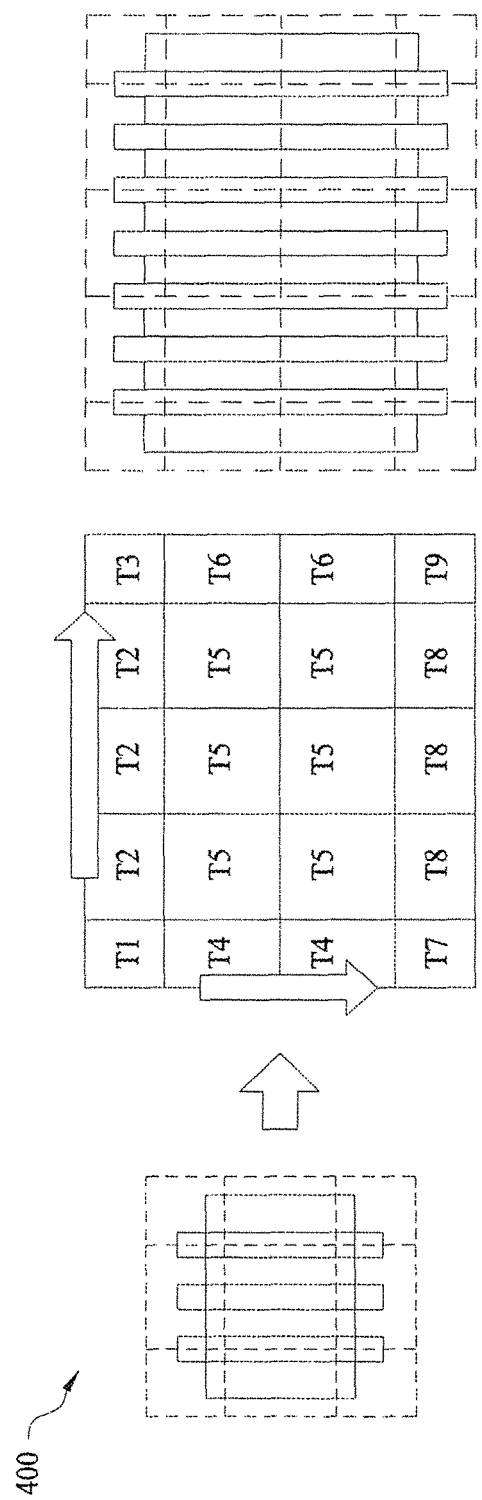

FIGS. 5A-5C illustrate various block diagrams for expanding dummy fin cells in accordance with some embodiments. A standard dummy fin cell is divided into logical partitions, and expanded dummy fin cells may be formed by combining integer multiples of the logical partitions. Such expanded dummy fin cells may be used to minimize unfilled space and increase polysilicon gate density in empty regions of an IC layout. Although FIGS. 5A-5C are described with reference to the standard dummy fin cell 400 of FIG. 4A, other standard dummy fin cells may be utilized as the basis for expansion.

Referring to FIG. 5A, the standard dummy fin cell 400 may be divided into multiple, logical partitions. For example, in the illustrated embodiments, the standard dummy fin cell 400 is divided into nine partitions T1 through T9 configured in a three partition by three partition rectangle. The standard dummy fin cell 400 may include corner partitions T1, T3, T7, and T9 disposed at top left, top right, bottom left, and bottom right corners, respectively. The standard dummy fin cells 400 may further include middle partitions T2 (e.g., disposed between corner partitions T1 and T3), T4 (e.g., disposed between corner partitions T1 and T7), T5 (e.g., disposed in a center of the standard dummy fin cell 400), T8 (e.g., disposed between corner partitions T7 and T9), and T6 (e.g., disposed between corner partitions T3 and T9). The three partition by three partition rectangle of the standard dummy fin cell 400 includes a top row (including partitions T1, T2, T3), a middle row (including partitions T4, T5, and T6), a bottom row (including partitions T7, T8, and T9), a left column (including partitions T1, T4, and T7), a middle column (including partitions T2, T5, and T8), and a right column (including partitions T3, T6, and T9). Although a rectangular standard dummy fin cell formed of rectangular partitions is shown, the standard dummy fin cell need not be rectangular and/or the partitions that form the standard dummy fin cell need not be rectangular.

Expanded dummy fin cells may be created using the defined shapes and dimensions of partitions T1 through T9 of the standard dummy fin cell 400. In this regard, the expanded dummy fin cells may be considered to be based on (e.g., derived from) the standard dummy fin cell 400. FIGS. 5B and 5C illustrate examples of expanded dummy fin cells formed from partitions T1 through T9 of the standard dummy fin cell 400. In some embodiments, to form an expanded dummy fin cell, corner partitions T1, T3, T7, and T9 remain constant while middle partitions T2, T4, T5, T6, and/or T8 may be multiplied by any integer and combined to create the expanded dummy fin cell. Expansion may be performed in one or both of horizontal and vertical directions.

The multiplying applied to columns and rows in an expanded dummy fin cell may or may not be equal. For example, FIG. 5B illustrates an expanded dummy fin cell having columns and rows being multiplied by a same integer (e.g., 2) while FIG. 5C illustrates an expanded dummy fin cell having columns and rows being multiplied by different integers. Specifically, FIG. 5B illustrates an expanded dummy fin cell formed by doubling the middle column (including partitions T2, T5, and T8) and middle row (including partitions T4, T5, and T6) of the standard dummy fin cell 400. FIG. 5C illustrates an expanded dummy fin cell formed by tripling the number of middle columns of the standard dummy fin cell 400 and doubling the number of middle rows of the standard dummy fin cell 400. Other integer multiples may be applied to form an expanded dummy fin cell from the standard dummy fin cell 400.

Figure 6:
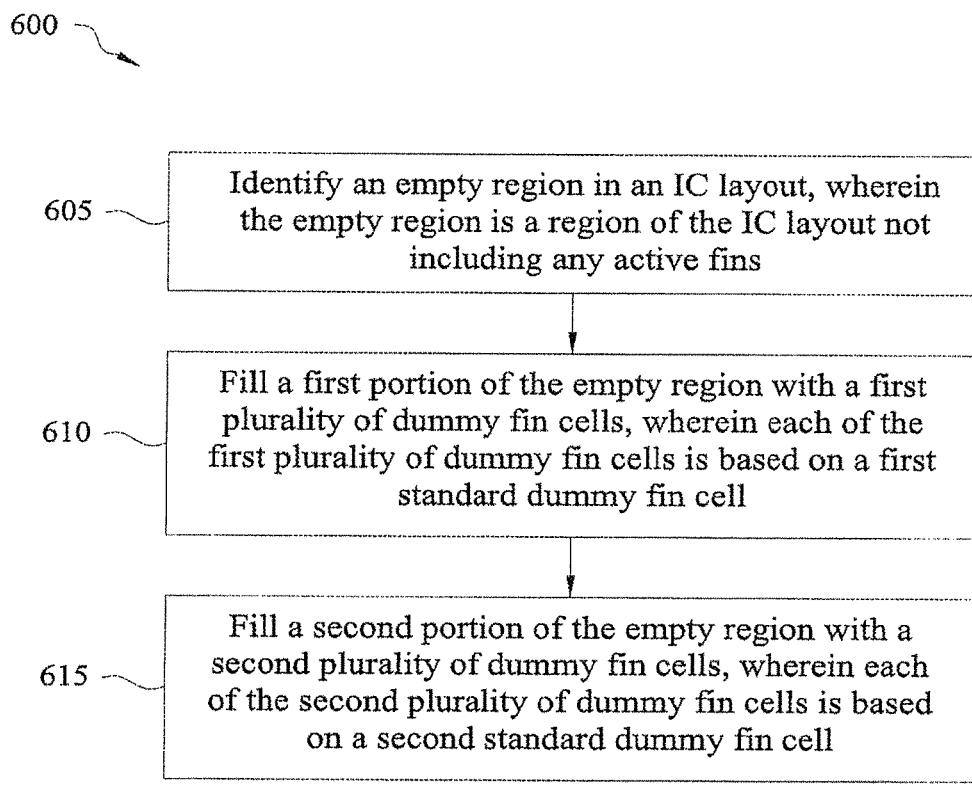
FIG. 6 illustrates a flow diagram of an exemplary process of forming an integrated circuit layout in accordance with some embodiments.

FIG. 6 illustrates a flow diagram of an exemplary process 600 of forming an IC layout in accordance with some embodiments. The blocks of exemplary process 600 are described herein as occurring in series, or linearly. However, multiple blocks of exemplary process 600 may occur in parallel. In addition, the blocks of exemplary process 600 need not be performed in the order shown and/or one or more of the blocks of exemplary process 600 need not be performed. In some embodiments, the exemplary process 600 is performed by a processor circuit. Once the IC layout is formed, the IC layout may be implemented by fabricating a physical IC based on the IC layout.

At block 605, an empty region in an IC layout is identified. The empty region is a region of the IC layout that does not include any active fins. In some embodiments, the empty region is identified after device regions have been placed on the IC layout. The empty region may be divided into multiple portions based on respective distances between the portions and the device regions. The device regions may include spatial allocations/definitions on the IC layout for active components (e.g., transistors, active fins) and passive components.

The empty regions may be identified as regions outside of a minimum spacing employed between the dummy fins and the active fins. The minimum spacing constraint may be imposed to avoid failures in a photolithographic operation due to the absence of dummy fin cells and/or to prevent the presence of the dummy fin structures in the fabricated physical IC so as to not interfere with IC functionality.

At block 610, a first portion of the empty region is filled with a first plurality of dummy fin cells. The dummy fin cells that compose the first plurality of dummy fin cells may be based on (e.g., derived from) a first standard dummy fin cell. The first standard dummy fin cell may be associated with a first set of characteristics (e.g., gate width, polysilicon size, device region size).

At block 615, a second portion of the empty region is filled with a second plurality of dummy fin cells. The dummy fin cells that compose the second plurality of dummy fin cells may be based on a second standard dummy fin cell. The second standard dummy fin cell may be associated with a second set of characteristics.

Although FIG. 6 makes reference to two portions of the empty region, in some embodiments, additional portions of the empty region are filled with dummy fin cells that are identical to or derived from the first standard dummy fin cell, the second standard dummy fin cell, or other standard dummy fin cells. As an example, in some embodiments, the first portion encompasses the second portion, such that the second portion includes portions of the first portion not filled by the first plurality of dummy fin cells.

As another example, a third portion of the empty region may be filled with dummy fin cells derived from a third standard dummy fin cell. In some embodiments, the first portion of the IC is farthest away from the device region, the second portion of the IC is closest to the device region, and the third portion is between the first and second portions of the IC. In some embodiments, the third portion does not overlap the first and second portions. The third portion may be filled with dummy fin structures such that the third portion has a higher polysilicon density than the first and second portions. In some embodiments, such a distribution in the polysilicon density across different portions of the empty region may reduce CMP loading.

Once the IC layout is formed, the IC layout may be implemented in a physical IC. For example, the dummy fin cells in the IC layout may be fabricated to form dummy fin structures on the physical IC.

In some embodiments, the first standard dummy fin cell has a first number of gates structures, with each gate structure having a first gate width, and the second standard dummy fin cell has a second number of gate structures, with each gate structure having a second gate width. The first number of gate structures may differ from the second number of gate structures, and/or the first gate width may differ from the second gate width. In some embodiments, the first standard dummy fin cell and the second standard dummy fin cells have polysilicon gate structures. The polysilicon gate density associated with different portions of an empty region are based at least in part on the number of gate structures and the gate width of the gate structures utilized to fill in the empty region in some embodiments.

In some embodiments, each of the first plurality of dummy fin cells is the same as (e.g., has the same dimensions as) the first standard dummy fin cell. In such embodiments, the first portion of the empty region is filled with dummy fin cells that are identical to the first standard dummy fin cell. In some embodiments, dummy fin cells that compose the second plurality of dummy fin cells may be expanded. In some cases, at least one of the second plurality of dummy fin cells is derived from, but not the same as, the second standard dummy fin cell. For example, the second plurality of dummy fin cells may include an expanded dummy tin cell that is derived from the second standard dummy fin cell. The expanded dummy fin cell may be larger than the second standard dummy fin cell along at least one dimension. For example, the expanded dummy fin cell may be formed by duplicating one or more partitions of the second standard dummy fin cell. The partitions that form the expanded dummy fin cell are a superset of the partitions that form the second standard dummy fin cell.

In some embodiments, the IC layout includes regions designated for implantation. These implantation regions may be designated for n-plus doping while other implantation regions may be designated for p-plus doping. In some embodiments, the implantation regions are defined in the IC layout prior to filling any empty regions with dummy fin cells. Some regions of the IC layout are not designated as implantation regions. In some embodiments, a standard dummy fin cell is defined with an implantation layer. The implantation layer may include definitions for the n-type and p-type wells included in the standard dummy fin cell, such as dopant(s) and dopant concentration(s) of the n-type and p-type wells. In some embodiments, such a standard dummy fin cell, and dummy fin cells derived from this standard dummy fin cell, are placed on regions not designated as implantation regions in the IC layout so that the definitions of the implantation regions in the IC layout do not conflict with the implantation included in the standard dummy fin cell. N-type dopants may be, for example, boron, boron difluoride ($BF_2$), fluorine, indium, or combinations thereof. P-type dopants may be, for example, phosphorus, arsenic, fluorine, or combinations thereof.

Figure 7:
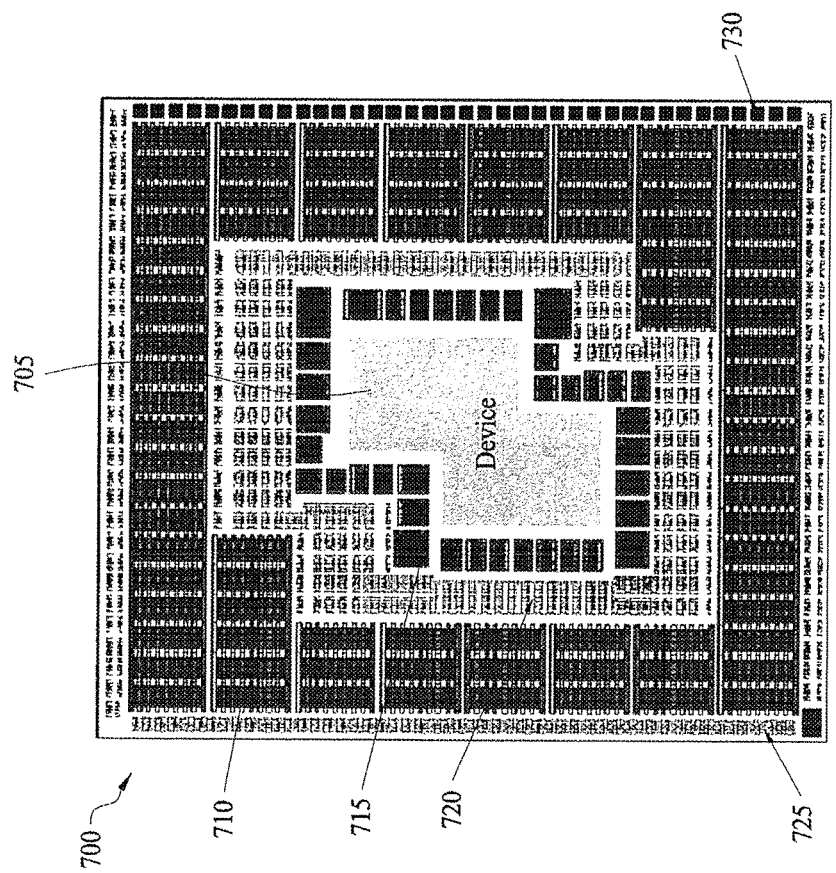
FIG. 7 illustrates an example of an integrated circuit that includes a device and a region that surrounds the device, in accordance with some embodiments.

FIG. 7 illustrates an example of an IC 700 that includes a device 705 and a region that surrounds the device 705, according to some embodiments of the present disclosure. The region is filled with dummy fin structures. The region includes a first plurality of dummy fin cells 710, second plurality of dummy fin cells 715, third plurality of dummy fin cells 720, fourth plurality of dummy fin cells 725, and fifth plurality of dummy fin cells 730. In some cases, each of the first through fifth plurality of dummy fin cells may be associated with a respective set of characteristics, examples of which will be described below with respect to FIGS. 9-13.

Figure 8:
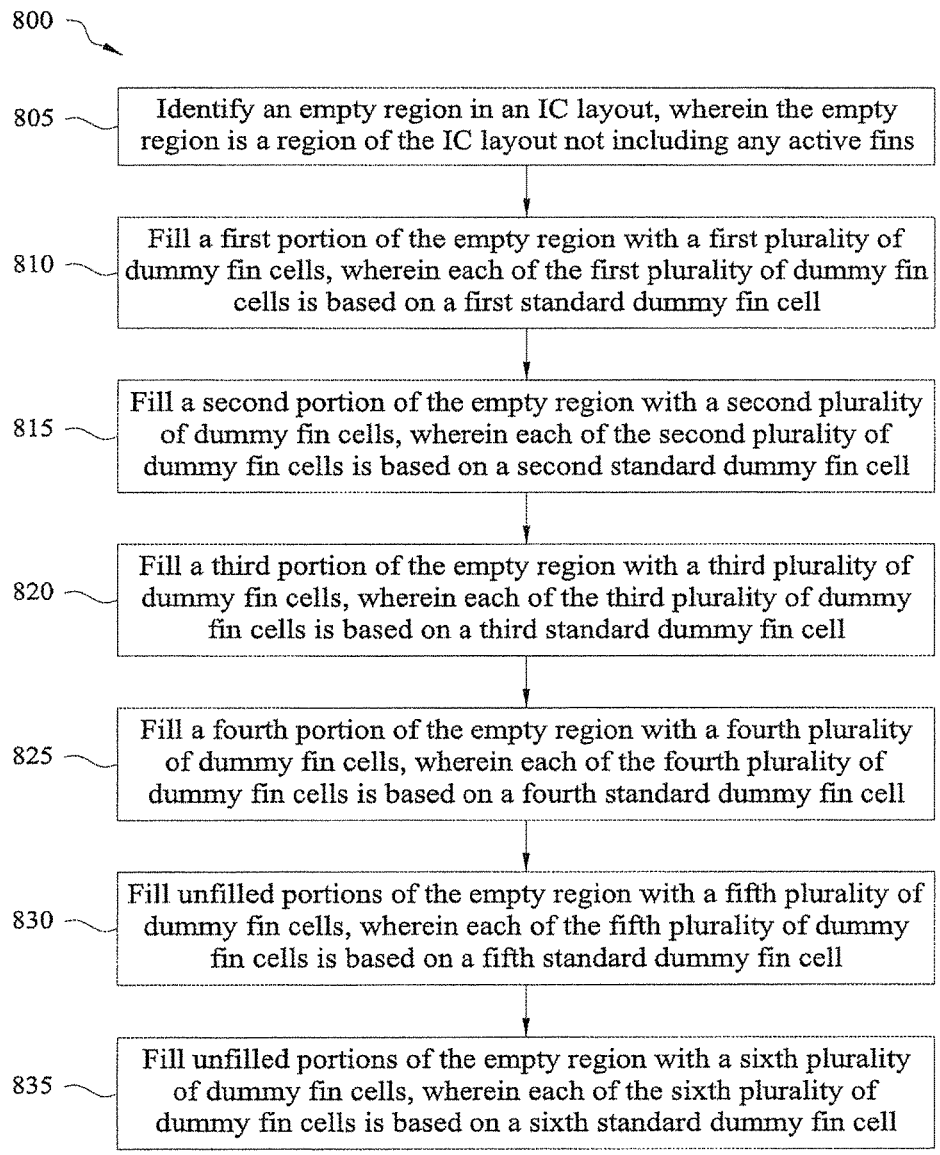
FIG. 8 illustrates a flow diagram of an exemplary process of forming an integrated circuit layout that, when implemented, forms the integrated circuit illustrated in FIG. 7.

FIG. 8 illustrates a flow diagram of an exemplary process 800 of forming an IC layout that, when implemented, forms the IC 700 illustrated in FIG. 7 using standard dummy fin cells illustrated in FIGS. 9-14. Thus, the exemplary process 800 is described herein with reference to FIG. 7 and FIGS. 9-14. The blocks of exemplary process 800 are described herein as occurring in series, or linearly. However, multiple blocks of exemplary process 800 may occur in parallel. In addition, the blocks of exemplary process 800 need not be performed in the order shown and/or one or more of the blocks of exemplary process 800 need not be performed. In some embodiments, the exemplary process 800 is performed by a processor circuit.

At block 805 of FIG. 8, an empty region in an IC layout is identified. The empty region may be divided into multiple portions based on respective distances between the portions and a device region. The device region of the IC layout is used for defining the device 705 once the IC layout is implemented. In some cases, the device 705 may be a transistor device with a polysilicon width less than around 0.014 µm. In some embodiments, the device 705 is a core device. In some embodiments, the device 705 operates at a voltage between around 0.7 V and 0.9 V.

At block 810 of FIG. 8, a first portion of the empty region is filled with a first plurality of dummy fin cells 710. The dummy fin cells that compose the first plurality of dummy fin cells 710 may be based on (e.g., derived from) a first standard dummy fin cell 900 illustrated in FIG. 9. In some embodiments, each of the first plurality of dummy fin cells 710 is the same as the first standard dummy fin cell 900. In these embodiments, dummy fin cells of the first plurality of dummy fin cells 710 are not resized (e.g., expanded). In some embodiments, a dummy fin cell of the first plurality of dummy fin cells 710 overlap along an x-direction with another dummy fin cell of the first plurality of dummy fin cells 710. In some embodiments, the first portion of the empty region is at least 2 µm away from the device region.

Figure 9:
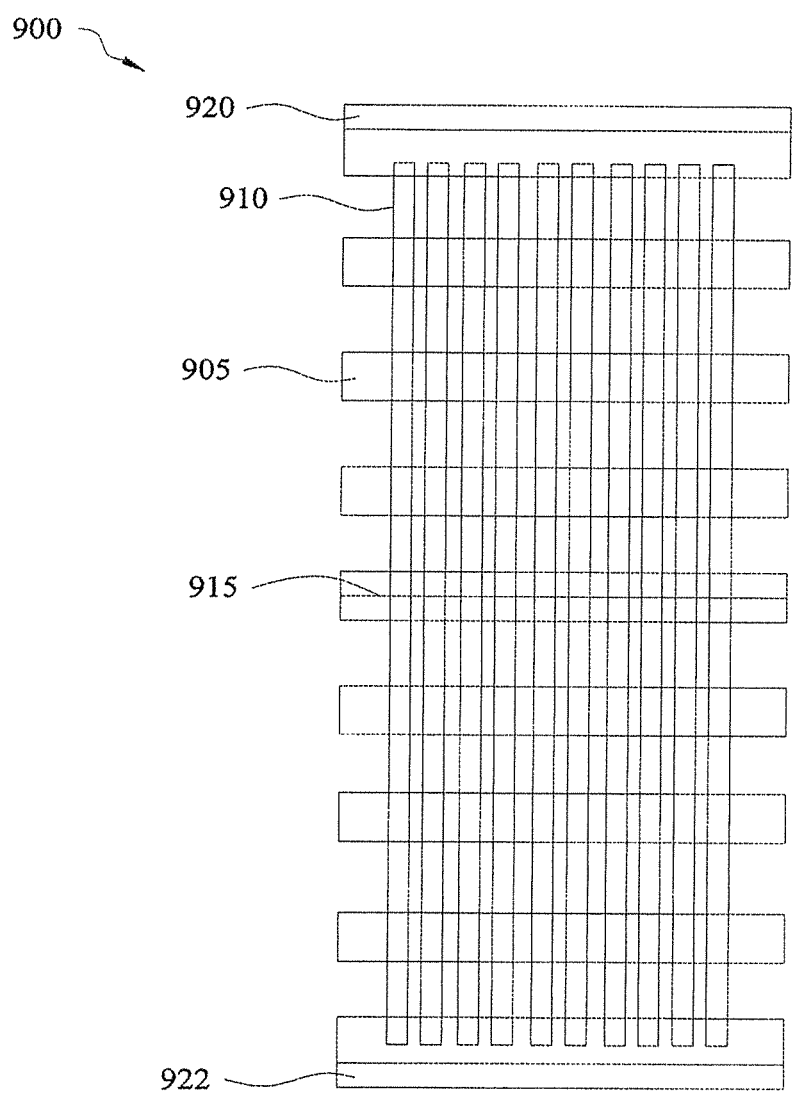
FIGS. 9-14 illustrate examples of standard dummy fin cells in accordance with some embodiments.

FIG. 9 illustrates an example of the first standard dummy fin cell 900 used in block 810 of FIG. 8. The first standard dummy fin cell 900 may include dummy fins 905 and dummy gates 910. In some embodiments, the first standard dummy fin cell 900 has gates (e.g., polysilicon gates) with a gate width of 14 nm. In some embodiments, the first standard dummy fin cell 900 may include an implantation layer 915. In this embodiment, the first plurality of dummy fin cells 710 is placed on regions of the IC layout that are not designated as implantation regions, since the dummy fin cells are defined with the implantation layer 915. In some embodiments, the first standard dummy fin cell 900 is defined with a cut poly layer 920 that is utilized to provide a separation between the polysilicon gate of different dummy fin cells. In these embodiments, the first plurality of dummy fin cells 710 does not overlap with one another in the y-direction.

At block 815 of FIG. 8, a second portion of the empty region is filled with a second plurality of dummy fin cells 715. The dummy fin cells that compose the second plurality of dummy fin cells 715 may be based on a second standard dummy fin cell 1000 illustrated in FIG. 10. In some embodiments, dummy fin cells of the second plurality of dummy fin cells 715 are allowed to expand along the x- and y-directions. In some embodiments, the second portion of the empty region is within 1 µm from the device region. In some embodiments, a dummy fin cell of the second plurality of dummy fin cells 715 is not allowed to overlap with any other dummy fin cell.

Figure 10:
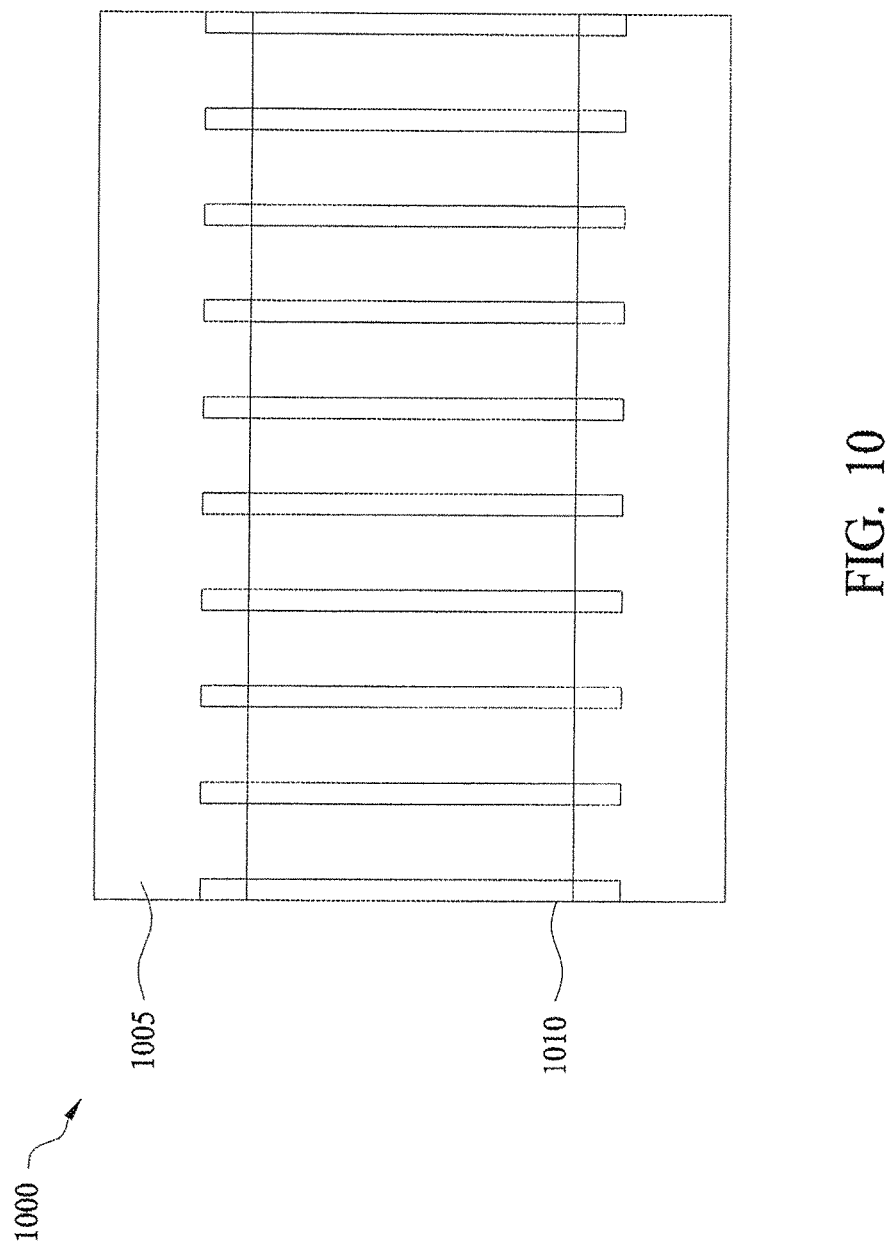

FIG. 10 illustrates an example of the second standard dummy fin cell 1000 used in block 815 of FIG. 8. The second standard dummy fin cell 1000 may include dummy fins 1005 and dummy gates 1010. In some embodiments, the second standard dummy fin cell 1000 has gates (e.g., polysilicon gates) with a gate width of 10 nm. In some embodiments, the second standard dummy fin cell 1000 does not have an implantation layer. The second plurality of dummy fin cells 715 may be used to fill implantation regions designated in the IC layout as well as regions not designated as implantation regions.

At block 820 of FIG. 8, a third portion of the empty region is filled with a third plurality of dummy fin cells 720. The dummy fin cells that compose the third plurality of dummy fin cells 720 may be based on a third standard dummy fin cell 1100 illustrated in FIG. 11. In some embodiments, a dummy fin cell of the third plurality of dummy fin cells 720 may overlap along a y-direction. In some embodiments, a dummy fin cell of the third plurality of dummy fin cells 720 is expanded in the x- and y-directions. In some embodiments, the third portion of the empty region is between 1 µm and 2 µm from the device region.

Figure 11:
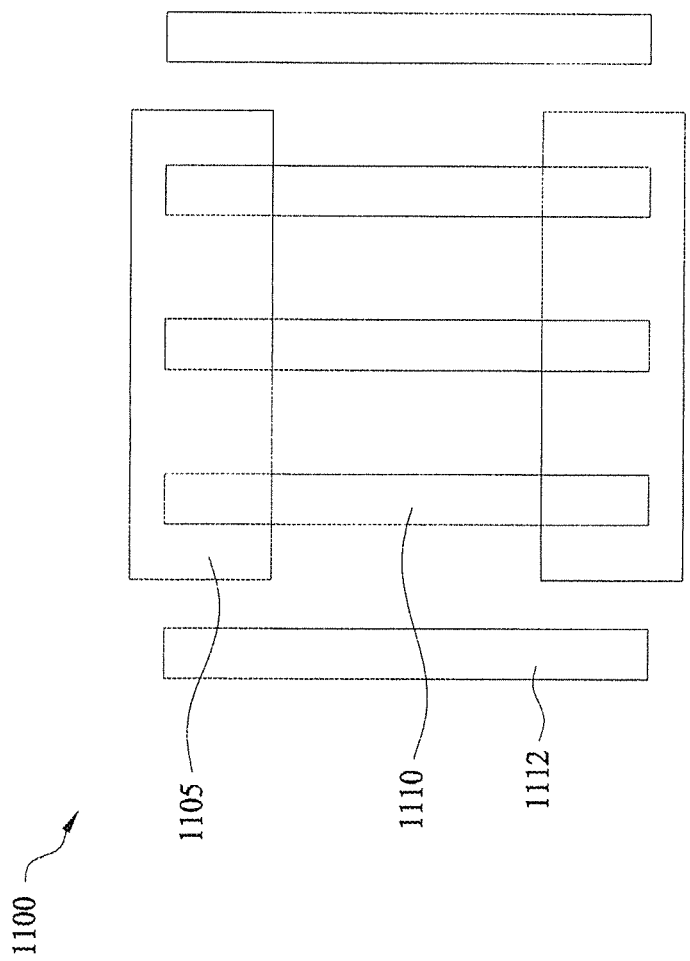

FIG. 11 illustrates an example of the third standard dummy fin cell 1100 used in block 820 of FIG. 8. The third standard dummy fin cell 1100 may include dummy fins 1105 and dummy gates 1110 and 1112. In some embodiments, dummy fin cells of the third plurality of dummy fin cells 720 have gates (e.g., polysilicon gates) with a gate width of 36 nm. Some dummy gates (e.g., 1110) have dummy fins 1105 disposed over them whereas other dummy gates (e.g., 1112) do not have dummy fins 1105 disposed over them. In some embodiments, dummy fin cells of the third plurality of dummy fin cells 720 do not have an implantation layer. The third plurality of dummy fin cells 720 may be used to fill implantation regions designated in the IC layout as well as regions not designated as implantation regions.

At block 825 of FIG. 8, a fourth portion of the empty region is filled with a fourth plurality of dummy fin cells 725. The fourth portion of the empty region may surround the first portion of the empty region. The dummy fin cells that compose the fourth plurality of dummy fin cells 725 may be based on a fourth standard dummy fin cell 1200 illustrated in FIG. 12. In some embodiments, the fourth portion of the empty region is in an input/output (I/O) region of IC layout. The I/O region may be associated with higher voltages (e.g., than a core region). In some embodiments, the dummy fin cells of the fourth plurality of dummy fin cells 725 do not have an implantation layer. The fourth plurality of dummy fin cells 725 may be used to fill implantation regions designated in the IC layout as well as regions not designated as implantation regions. In some embodiments, a dummy fin cell of the fourth plurality of dummy fin cells 725 does not overlap with any other dummy fin cell. In some embodiments, the dummy fin cells of the fourth plurality of dummy fin cells 725 is expanded in the x- and/or y-direction.

Figure 12:
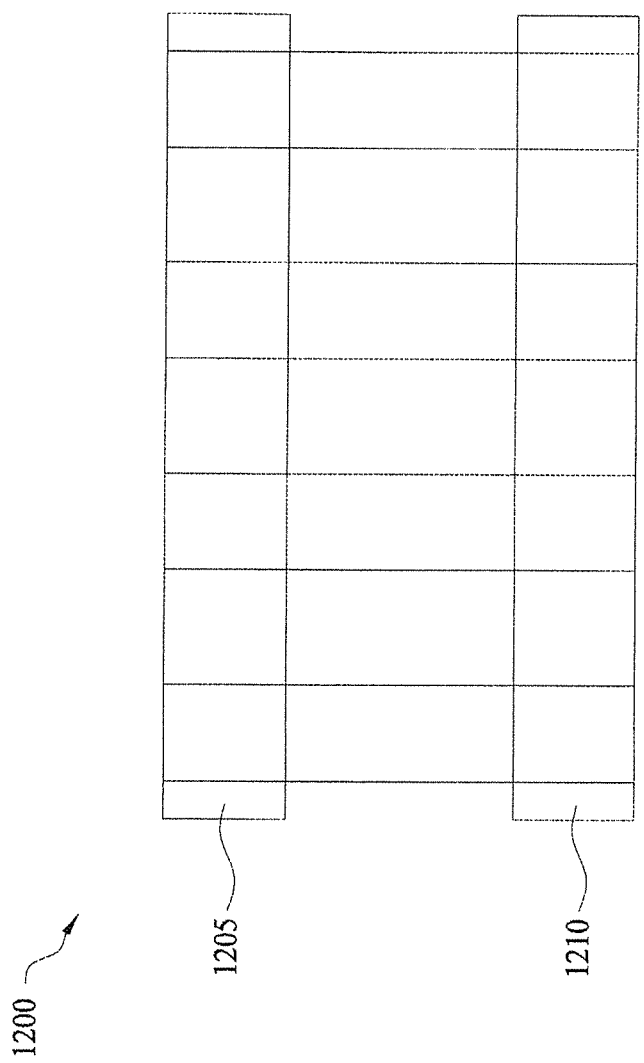

FIG. 12 illustrates an example of the fourth dummy fin cell 1200 used in block 825 of FIG. 8. The fourth standard dummy fin cell 1200 may include dummy fins 1205 and dummy gates 1210. In some embodiments, the dummy fin cells of the fourth plurality of dummy fin cells 725 have gates (e.g., polysilicon gates) with a gate width of 86 nm. The larger gate width may be utilized to allow operation under higher voltages, such as those associated with an I/O operation. Due to the larger gate width, not allowing overlap between dummy fin cells of the fourth plurality of dummy fin cells 725 may help avoid the polysilicon gate density from being too high.

At block 830 of FIG. 8, portions of the empty region that cannot be filled in with the first, second, third, and fourth plurality of dummy fin cells (710, 715, 720, and 725, respectively) are filled in with a fifth plurality of dummy fin cells 730. The dummy fin cells that compose the fifth plurality of dummy fin cells 730 may be based on a fifth standard dummy fin cell 1300 illustrated in FIG. 13. The fifth plurality of dummy fin cells 730 may be used to fill in portions outside of the first, second, third, and fourth portions of the empty region and/or areas within the first, second, third, and/or fourth portions. For example, the fifth plurality of dummy fin cells 730 may be of a size smaller than the first, second, third, and fourth plurality of dummy fin cells (710, 715, 720, and 725, respectively) such that dummy fin cells of the fifth plurality of dummy fin cells 730 can fill in residual unfilled regions of the empty region subsequent to placement of the first, second, third, and fourth plurality of dummy fin cells (710, 715, 720, and 725, respectively) on the IC layout. In some embodiments, the fifth plurality of dummy fin cells 730 does not have an implantation layer. The fifth plurality of dummy fin cells 730 may be used to fill implantation regions designated in the IC layout as well as regions not designated as implantation regions. In some embodiments, a dummy fin cell of the fifth plurality of dummy fin cells 730 does not overlap with any other dummy fin cell. In some embodiments, a dummy fin cell of the fifth plurality of dummy fin cells 730 is expanded.

Figure 13:
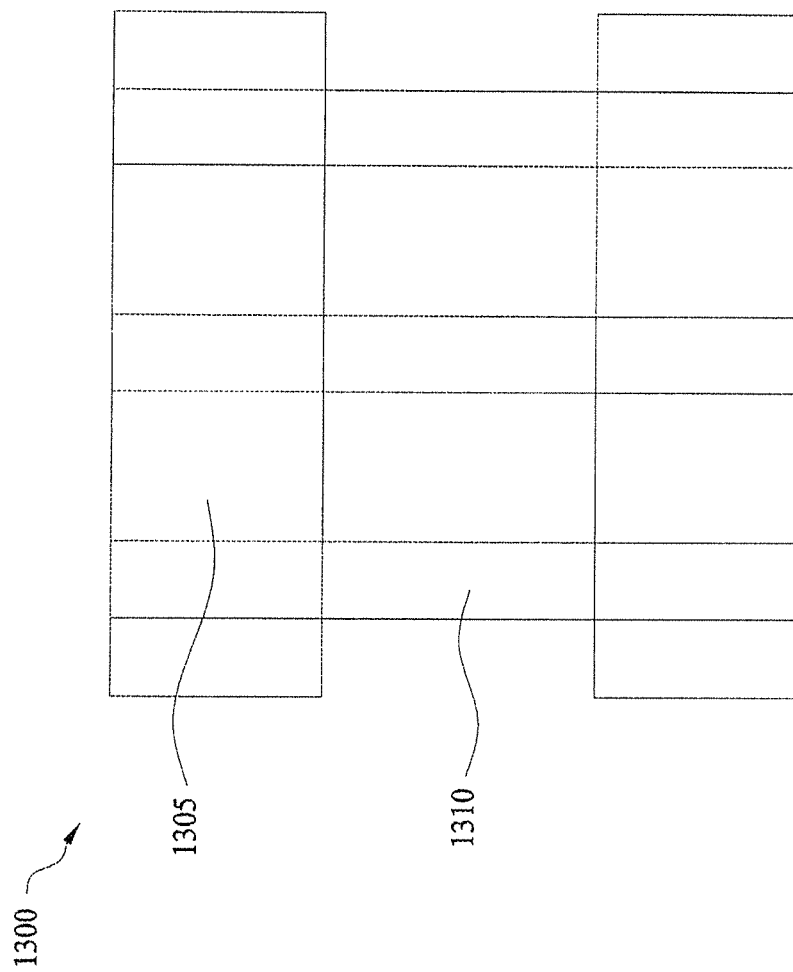

FIG. 13 illustrates an example of the fifth standard dummy fin cell 1300 used in block 830 of FIG. 8. The fifth standard dummy fin cell 1300 may include dummy fins 1305 and dummy gates 1310. In some embodiments, the dummy fin cells of the fifth plurality of dummy fin cells 730 have gates (e.g., polysilicon gates) with a gate width of 36 nm.

At block 835 of FIG. 8, portions of the empty region that cannot be filled in with the first, second, third, fourth, and fifth plurality of dummy fin cells (710, 715, 720, 725, and 730 respectively) can be filled in with a sixth plurality of dummy fin cells. It is noted that the sixth plurality of dummy fin cells is not shown in FIG. 7. The sixth plurality of dummy fin cells may be used to fill in portions outside of and/or within the first, second, third, fourth, and fifth portions of the empty region. The dummy fin cells that compose the sixth plurality of dummy fin cells may be based on a sixth standard dummy fin cell 1400 illustrated in FIG. 14. In some embodiments, the dummy fin cells of the sixth plurality of dummy fin cells have gates (e.g., polysilicon gate) with a gate width of 36 nm. In some embodiments, the dummy fin cells of the sixth plurality of dummy fin cells do not have an implantation layer. In some embodiments, a dummy fin cell of the sixth plurality of dummy fin cells does not overlap other dummy fin cells of sixth plurality of dummy fin cells. In some embodiments, the sixth plurality of dummy fin cells is formed via an expansion of the sixth standard dummy fin cell 1400.

Figure 14:
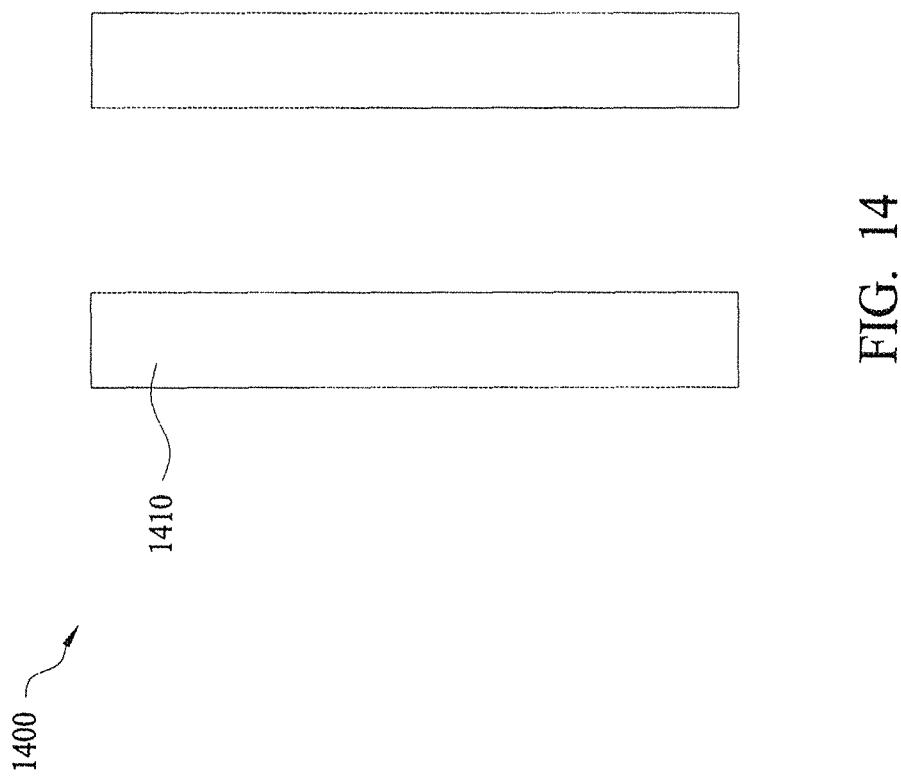

FIG. 14 illustrates an example of the sixth standard dummy fin cell 1400 used in block 835 of FIG. 8. The sixth standard dummy fin cell 1400 may include dummy gates 1410. In some embodiments, the sixth plurality of dummy fin cells includes polysilicon gates (e.g., disposed on a substrate surface) but does not include fins.

Although FIGS. 7 and 8 describe having dummy fin cells associated with six standard dummy fin cells, additional, fewer, and/or different standard dummy fin cells may be utilized. In some embodiments, a portion of the empty region is filled in with dummy fin cells derived from different standard dummy fin cells. For example, with reference to FIG. 7, the first portion of the empty region may be filled with the first plurality of dummy fin cells, and remaining areas within the first portion not filled by the first plurality of dummy fin cells may be filled with dummy fin cells derived from other standard dummy fin cells.

In some embodiments, the third standard dummy fin cell 1100 has a larger gate width than the first standard dummy fin cell 900 and the second standard dummy fin cell 1000. The larger width may allow the third portion of the IC layout to have a higher polysilicon gate density than the first and second portions.

In some embodiments, when fabricated, the polysilicon gate defined in the dummy fin cells is replaced with another type of metal gate material in the physical IC. The metal gate material in the physical IC may include one or more layers of conductive material, such as polysilicon, aluminum, copper, titanium, tantalum, tungsten, cobalt, molybdenum, tantalum nitride, nickel silicide, cobalt silicide, TiN, WN, TiAl, TiAlN, TaCN, TaC, TaSiN, metal alloys, other suitable materials, and/or combinations thereof.

Figure 15:
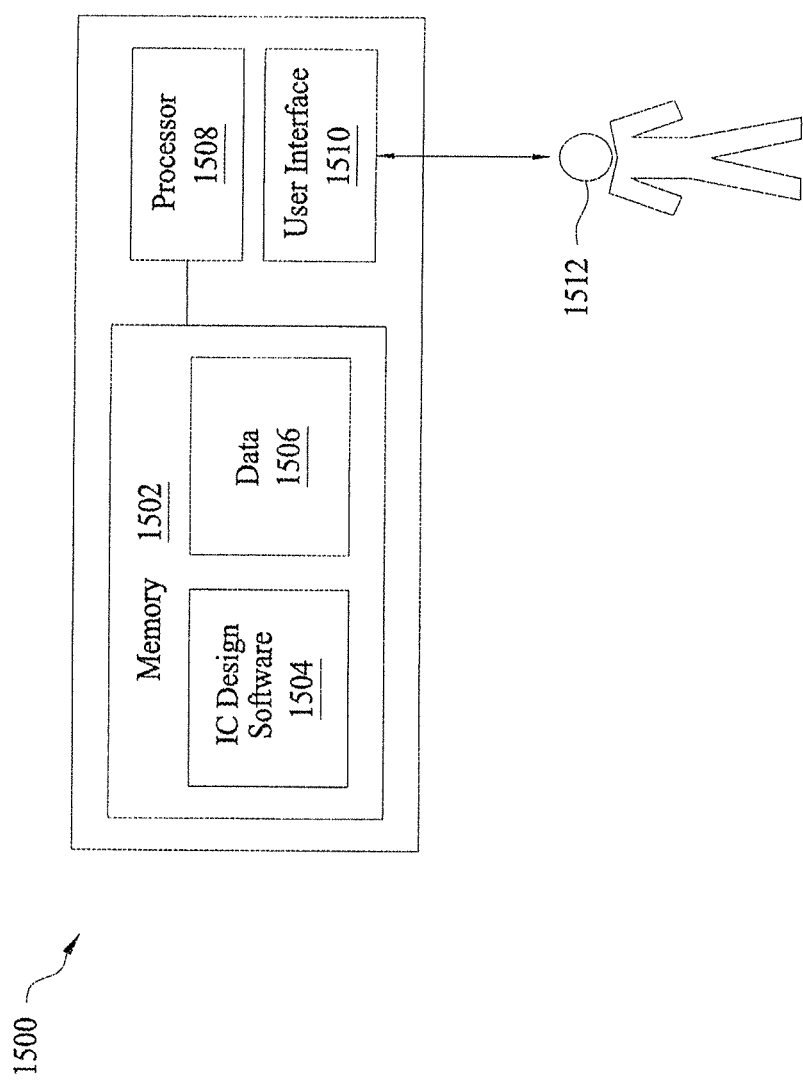
FIG. 15 is a diagram showing an example of a computing system that can be used to form an integrated circuit layout design.

FIG. 15 is a diagram showing an example of a computing system 1500 that can be used to form an IC layout design. In some embodiments, the computing system 1500 is used to perform the exemplary process 800 of FIG. 8. Accordingly to certain illustrative examples, the computing system 1500 includes a memory 1502 having IC design software 1504 and data 1506 stored thereon. The computing system 1500 also includes a processor circuit 1508 and a user interface 1510.

There are many types of memory available. Some types of memory, such as solid state drives, are designed for storage. These types of memory may have large storage volume but relatively slow performance. Other types of memory, such as those used for random access memory (RAM), may be optimized for speed. The various forms of memory may store information in the form of the IC design software 1504 and data 1506. In some embodiments, the IC design software 1504 is a CAD tool that facilitates forming of IC layouts. In some embodiments, the data 1506 includes definitions of the dummy fin cells (e.g., to be utilized by the IC design software 1504) and/or the GDS files of the IC layouts that are formed using the IC design software 1504.

The IC design software 1504 may include the tools to form an IC layout and analyze (e.g., simulate) a formed layout. The IC design software 1504 may include tools that allow placement, movement, and adjustment of the various components of an IC, such as the substrate 102, fin structure array 104, and dummy fin structure array 106 of FIG. 1. For instance, the IC design software 1504 may estimate characteristics (e.g., through simulation) of an IC associated with the formed IC layout and allow a user 1512 to adjust characteristics of the components (e.g., gate size, fin width, etc.) and/or move the components in the IC layout.

A user interface 1510 may allow the user 1512 to interact with the computing system 1500. The user 1512 may use various tools such as a keyboard or a mouse to input information into the computing system 1500. Additionally, various output devices such as a monitor may be used to provide/present information to the user 1512.

It will be understood that not all advantages have been necessarily discussed herein, no particular advantage is required for all embodiments or examples, and other embodiments or examples may offer different advantages.

In accordance with one aspect of the present disclosure, in a method of forming an integrated circuit (IC) layout, an empty region in the IC layout is identified by a processor circuit, wherein the empty region is a region of the IC layout not including any active fins. A first portion of the empty region is filled with a first plurality of dummy fin cells, wherein each of the first plurality of dummy fin cells is based on a first standard dummy fin cell, and wherein the first standard dummy fin cell has a first gate width and comprises a first plurality of partitions. A second portion of the empty region is filled with a second plurality of dummy fin cells, wherein each of the second plurality of dummy fin cells is based on a second standard dummy fin cell, and wherein the second standard dummy fin cell has a second gate width and comprises a second plurality of partitions.

In accordance with another aspect of the present disclosure, an integrated circuit includes a semiconductor device formed over a substrate. A first plurality of dummy fin structures is disposed over a first portion of the substrate, wherein each of the first plurality of dummy fin structures has a first gate width, the first plurality of dummy fin structures being based on a first standard dummy fin cell. A second plurality of dummy fin structures is disposed over a second portion of the substrate, wherein each of the second plurality of dummy fin structures has a second gate width different from the first gate width, the first plurality of dummy fin structures being based on a second standard dummy fin cell. The second portion surrounds the semiconductor device and the first portion surrounds the second portion.

In accordance with one aspect of the present disclosure, in a method of forming an integrated circuit (IC) layout, an empty region in the IC layout that surrounds a device region in the IC layout is identified by a processor circuit, wherein the empty region is a region of the IC layout not including any active fins. The empty region is divided into a first portion and a second portion, wherein the first portion is associated with a shorter distance from the device region than the second portion. The first portion is filled with a first plurality of dummy fin cells, wherein each of the first plurality of dummy fin cells is based on a first standard dummy fin cell. The second portion is filled with a second plurality of dummy fin cells, wherein each of the second plurality of dummy fin cells is based on a second standard dummy fin cell, and wherein the second standard dummy fin cell has a gate width that is different from a gate width of the first standard dummy fin cell.

The foregoing outlines features of several embodiments or examples so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments or examples introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An integrated circuit, comprising:
a semiconductor device formed over a substrate;
a first plurality of dummy fin structures over a first portion of the substrate, wherein each of the first plurality of dummy fin structures has a first gate structure having a first gate width, and the first plurality of dummy fin structures being based on a first standard dummy fin cell; and
a second plurality of dummy fin structures over a second portion of the substrate, wherein each of the second plurality of dummy fin structures has a second gate structure having a second gate width different from the first gate width, and the second plurality of dummy fin structures being based on a second standard dummy fin cell,
wherein the second portion surrounds the semiconductor device and the first portion surrounds the second portion.

2. The integrated circuit of claim 1, further comprising:
a third plurality of dummy fin structures over a third portion of the substrate,
wherein each of the third plurality of dummy fin structures has a third gate structure having a third gate width different from the first gate width and the second gate width,
the third plurality of dummy fin structures are based on a third standard dummy fin cell, and
the third portion is between the first portion and the second portion.

3. The integrated circuit of claim 2, wherein the third portion has a higher polysilicon gate density than the first portion and the second portion.

4. The integrated circuit of claim 1, further comprising a third plurality of dummy fin structures within the first portion of the substrate,
wherein each of the third plurality of dummy fin structures has a third gate structure having a third gate width different from the first gate width and the second gate width, and
the third plurality of dummy fin structures are based on a third standard dummy fin cell.

5. The integrated circuit of claim 1, wherein the first and second pluralities of dummy fin structures are not utilized to form functional circuits.

6. The integrated circuit of claim 1, wherein the first and second pluralities of dummy fin structures undergo vertical expansion by multiplying heights of the first and second standard dummy fin cells by a constant.

7. The integrated circuit of claim 1, wherein the first and second pluralities of dummy fin structures undergo horizontal expansion by multiplying widths of the first and second standard dummy fin cells by a constant.

8. An integrated circuit, comprising:
a semiconductor device formed over a substrate;
a first plurality of dummy fin structures over a first portion of the substrate, wherein each of the first plurality of dummy fin structures has a first gate structure having a first gate width, the first plurality of dummy fin structures being based on a first standard dummy fin cell, and the first plurality of dummy fin structures comprise a first plurality of partitions; and
a second plurality of dummy fin structures over a second portion of the substrate, wherein each of the second plurality of dummy fin structures has a second gate structure having a second gate width different from the first gate width, the second plurality of dummy fin structures being based on a second standard dummy fin cell, and the second plurality of dummy fin structures comprise a second plurality of partitions,
wherein the second portion surrounds the semiconductor device and the first portion surrounds the second portion,
a quantity of the second plurality of partitions is greater than a quantity of the first plurality of partitions, and
at least one of the second plurality of dummy fin cells is larger than the second standard dummy fin cell along at least one dimension.

9. The integrated circuit of claim 8, further comprising:
a third plurality of dummy fin structures over a third portion of the substrate, wherein each of the third plurality of dummy fin structures has a third gate structure having a third gate width different from the first gate width and the second gate width, the third plurality of dummy fin structures are based on a third standard dummy fin cell, and the third portion is between the first portion and the second portion.

10. The integrated circuit of claim 9, wherein the third portion has a higher polysilicon gate density than the first portion and the second portion.

11. The integrated circuit of claim 8, further comprising a third plurality of dummy fin structures within the first portion of the substrate,
wherein each of the third plurality of dummy fin structures has a third gate structure having a third gate width different from the first gate width and the second gate width,
the third plurality of dummy fin structures are based on a third standard dummy fin cell.

12. The integrated circuit of claim 8, wherein the first and second pluralities of dummy fin structures are not utilized to form functional circuits.

13. The integrated circuit of claim 8, wherein the first and second pluralities of dummy fin structures undergo vertical expansion by multiplying heights of the first and second standard dummy fin cells by a constant.

14. The integrated circuit of claim 8, wherein the first and second pluralities of dummy fin structures undergo horizontal expansion by multiplying widths of the first and second standard dummy fin cells by a constant.

15. An integrated circuit, comprising:
a semiconductor device formed over a substrate;
a first plurality of dummy fin structures over a first portion of the substrate, wherein each of the first plurality of dummy fin structures has a first gate structure having a first gate width, the first plurality of dummy fin structures being based on a first standard dummy fin cell; and
a second plurality of dummy fin structures over a second portion of the substrate, wherein each of the second plurality of dummy fin structures has a second gate structure having a second gate width smaller than the first gate width, the second plurality of dummy fin structures being based on a second standard dummy fin cell,
wherein the second portion has a polysilicon gate density higher than the first portion, the second portion surrounds the semiconductor device and the first portion surrounds the second portion.

16. The integrated circuit of claim 15, further comprising:
a third plurality of dummy fin structures over a third portion of the substrate,
wherein each of the third plurality of dummy fin structures has a third gate structure having a third gate width different from the first gate width and the second gate width,
the third plurality of dummy fin structures are based on a third standard dummy fin cell, and
the third portion is between the first portion and the second portion.

17. The integrated circuit of claim 16, wherein the third portion has a higher polysilicon gate density than the first portion and the second portion.

18. The integrated circuit of claim 15, further comprising a third plurality of dummy fin structures within the first portion of the substrate,
wherein each of the third plurality of dummy fin structures has a third gate structure having a third gate width different from the first gate width and the second gate width,
the third plurality of dummy fin structures are based on a third standard dummy fin cell.

19. The integrated circuit of claim 15, wherein the first and second pluralities of dummy fin structures undergo vertical expansion by multiplying heights of the first and second standard dummy fin cells by a constant.

20. The integrated circuit of claim 15, wherein the first and second pluralities of dummy fin structures undergo horizontal expansion by multiplying widths of the first and second standard dummy fin cells by a constant.

* * * * *